US012536863B1

(12) United States Patent
Minard

(10) Patent No.: US 12,536,863 B1
(45) Date of Patent: Jan. 27, 2026

(54) GAMING SYSTEM AND METHOD WITH COIN PUSHER GAME FEATURE

(71) Applicant: Timothy J Minard, Duluth, GA (US)

(72) Inventor: Timothy J Minard, Duluth, GA (US)

( * ) Notice: Subject to any disclaimer, the term of this patent is extended or adjusted under 35 U.S.C. 154(b) by 337 days.

(21) Appl. No.: 17/994,268

(22) Filed: Nov. 25, 2022

Related U.S. Application Data

(63) Continuation of application No. 17/858,060, filed on Jul. 5, 2022, now abandoned, which is a continuation of application No. 17/732,293, filed on Apr. 28, 2022, now abandoned, which is a continuation of application No. 17/677,943, filed on Feb. 22, 2022, now abandoned, which is a continuation of application No. 17/545,821, filed on Dec. 8, 2021, now abandoned.

(60) Provisional application No. 63/122,914, filed on Dec. 8, 2020.

(51) Int. Cl.

| | |
|---|---|
| ***G07F 17/00*** | (2006.01) |
| ***G07F 17/32*** | (2006.01) |
| *G07F 17/34* | (2006.01) |

(52) U.S. Cl.
CPC ...... *G07F 17/3213* (2013.01); *G07F 17/3267* (2013.01); *G07F 17/3297* (2013.01); *G07F 17/34* (2013.01)

(58) Field of Classification Search
CPC ............. G07F 17/3213; G07F 17/3267; G07F 17/3297; G07F 17/34
See application file for complete search history.

(56) References Cited

U.S. PATENT DOCUMENTS

| | | | | |
|---|---|---|---|---|
| 5,275,400 A * | 1/1994 | Weingardt | G07F 17/32 | 463/28 |
| 5,816,915 A * | 10/1998 | Kadlic | G07F 17/32 | 463/13 |
| 2001/0031659 A1* | 10/2001 | Perrie | A63F 3/00643 | 463/18 |
| 2002/0098880 A1* | 7/2002 | Rodden | G07F 17/3297 | 463/2 |
| 2005/0239538 A1* | 10/2005 | Dixon | G07F 17/34 | 463/20 |
| 2008/0305856 A1* | 12/2008 | Walker | G07F 17/32 | 463/20 |
| 2012/0115581 A1* | 5/2012 | Englman | G07F 17/34 | 463/25 |
| 2013/0079110 A1* | 3/2013 | Nicely | G07F 17/3272 | 463/25 |
| 2013/0337901 A1* | 12/2013 | Saruta | A63F 13/10 | 463/25 |

(Continued)

*Primary Examiner* — Jeffrey K Wong
(74) *Attorney, Agent, or Firm* — Arnall Golden Gregory LLP

(57) ABSTRACT

Gaming systems and methods for providing wagering games in which a game outcome is determined that includes, either as part of a primary game or as a bonus game to the primary game, animations of coins dropping onto a coin pile resting on a platform, a pusher bar for pushing the coin pile towards a platform edge in the foreground, and coins spilling over the platform edge, wherein the coins spilling over the platform edge correspond with the awarding of a payout, wherein the payout is either randomly determined or determined based upon a computerized simulation of the natural physics involved with the coin pile being pushed by the pusher bar.

1 Claim, 10 Drawing Sheets

(56) References Cited

U.S. PATENT DOCUMENTS

| | | | | |
|---|---|---|---|---|
| 2014/0206427 | A1* | 7/2014 | Nakamura | G07F 17/3297 463/17 |
| 2016/0055718 | A1* | 2/2016 | Lyons | G07F 17/3258 463/27 |
| 2019/0206195 | A1* | 7/2019 | Kido | G07F 17/3213 |
| 2020/0357244 | A1* | 11/2020 | Oberberger | G07F 17/3267 |

* cited by examiner

GAMING SYSTEM AND METHOD WITH COIN PUSHER GAME FEATURE

BACKGROUND OF THE INVENTION

The invention relates generally to electronic gaming equipment, and more particularly, to an electronic gaming machines, games and game features that entertain and encourage continued game play.

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. In situations where the available gaming options include a number of competing machines and the expectation of winning each machine is roughly the same (or believed to be the same), players are most likely to be attracted to the gaming machines that the most entertaining and exciting, or otherwise which each player happens to find most appealing. Consequently, shrewd operators strive to employ a wide variety of gaming machines, including the most entertaining and exciting machines available, because such machines attract frequent play and, hence, increase profitability to the operator.

Many slot games employ a plurality of paylines for determining award outcomes. The advent of electronics, computers and electronic graphical displays, has enabled a continual increase in the complexity. Games typically include multiple paylines, many of which are not straight lines, and each cell may comprise a reel, such that every symbol in each cell is randomly selected. The paylines can be numerous and thus players sometimes are unable to easily discern the basis for a winning or losing outcome.

Accordingly, in the competitive gaming machine industry, there is a continuing need for gaming machine manufacturers to produce new types of games, gaming play features and enhancements to existing games, including games that are easier for players to determine the basis for the game outcome and award amount, and which will also attract frequent play by enhancing the entertainment value and excitement associated with the game.

SUMMARY OF THE INVENTION

The present disclosure is directed to, among other things, address the issues cited above, and is directed to inventions comprising gaming systems and methods for providing wagering games in which a game outcome is determined that includes, either as part of a primary game or as a bonus game to the primary game, animations of coins dropping onto a coin pile resting on a platform, a pusher bar for pushing the coin pile towards a platform edge in the foreground, and coins spilling over the platform edge, wherein the coins spilling over the platform edge correspond with the awarding of a payout, wherein the payout is either randomly determined or determined based upon a computerized simulation of the natural physics involved with the coin pile being pushed by the pusher bar.

Some embodiments of the invention are directed to a gaming system, comprising: a housing; at least one display device supported by the housing; a plurality of input devices supported by the housing; at least one processor; and at least one memory device that stores a plurality of instructions that, when executed by the at least one processor, cause the at least one processor to operate with the at least one display device and the plurality of input devices to: (a) establish a credit balance based at least in part on a monetary value; (b) place a wager to initiate play of a wagering game in response to receipt of an actuation of a wager button, the credit balance being decreasable by the wager; (c) randomly determine and display a game outcome of an instance of play of the wagering game, wherein the game outcome includes one or more of the display of (i) a randomly generated one or more symbols of a plurality of symbols, (ii) a feature randomly generated including a display of an animation involving a plurality of coins, (iii) a display of a coin pile depicted as being at rest on a platform with the platform having a platform edge in the foreground, and (iv) a display of an animation of a pusher bar depicted to alternatively move between a rearward position in the background to a position forward position towards the foreground, wherein the depiction of the pusher bar corresponds with the display of the coin pile being pushed towards the platform edge; (d) determine an award outcome, wherein the award outcome corresponds with a display including an animation of a depiction of one or more coins falling off the platform edge in the foreground of the coin pusher game display as a result of the movement of the pusher bar; and (e) increase the credit balance based on the award outcome.

In some embodiments of the aforementioned gaming system, the feature is a bonus feature of the wagering game.

In some embodiments the game outcome further comprises the display of a spinning wheel.

In some embodiments of the aforementioned gaming system, the displayed game outcome includes a depiction of one or more virtual reels forming an array of one or more rows and columns defining at least one cell therein, wherein the at least one cell includes a symbol display area.

BRIEF DESCRIPTION OF THE DRAWINGS

Other advantages of the invention will be readily appreciated as the same becomes better understood by reference to the following detailed description when considered in connection with the accompanying drawings wherein.

DETAILED DESCRIPTION OF SOME EMBODIMENTS OF THE INVENTION

Figure 1:
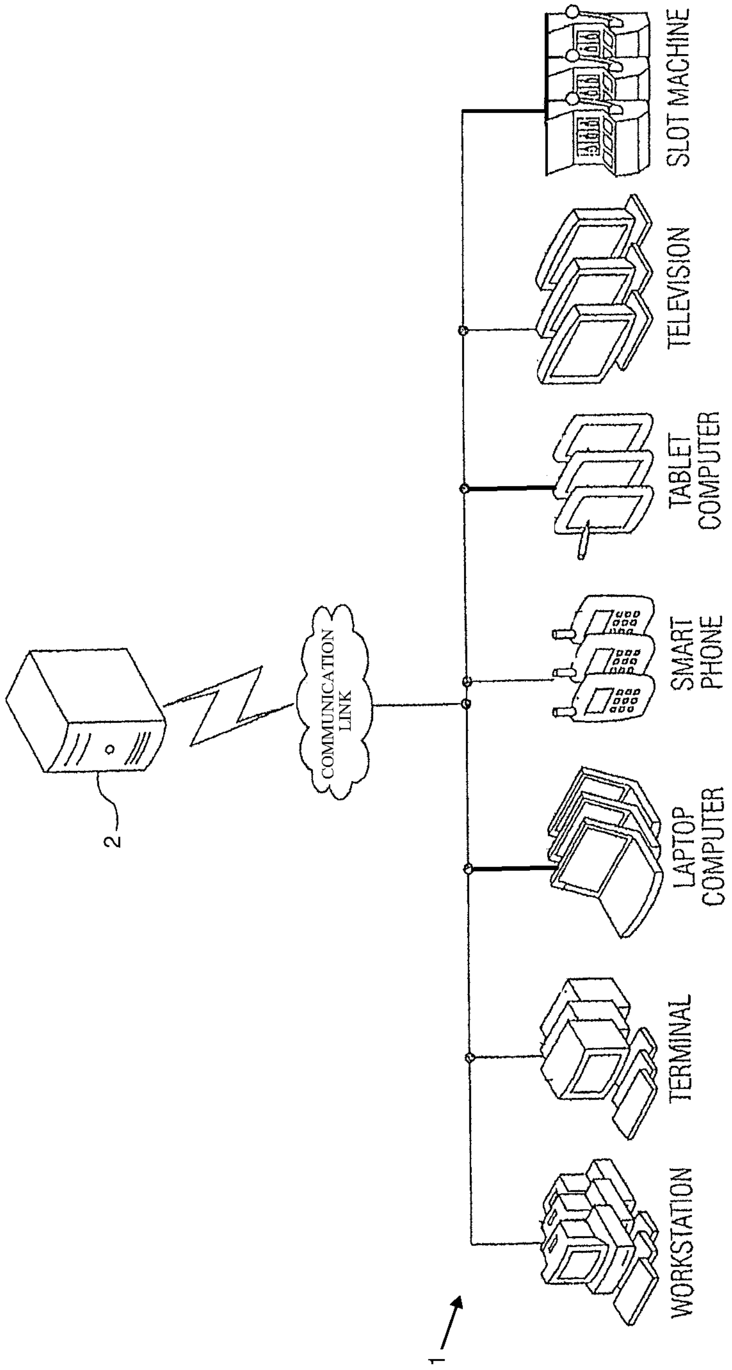
FIG. 1 is a schematic representation of various examples of gaming systems which may be used with embodiments of the invention.

The following detailed description provides systems and methods for implementing features in gaming applications. The gaming applications may be implemented in accordance or in conjunction with one or more of a variety of different types of gaming systems, such as those described herein, including computer-based platforms which may be specially configured for the provision of wagering games, such as electronic gaming machines, or other devices which are not specially configured for the provision of wagering games, such as a smartphone, but which can be enabled as a platform through which such gaming applications including the game features of the invention can be made accessible. Embodiments of the invention therefore contemplate a variety of different gaming systems in and through which gaming applications of the invention may be employed, each gaming system having one or more of a plurality of different features, attributes, or characteristics as disclosed herein.

It should be understood that some gaming systems include gaming machines, such as electronic gaming machines, are implemented with special features and/or additional circuitry that differentiates them from general-purpose computers (e.g., desktop PC's and laptops). Gaming machines are highly regulated to ensure fairness and, in many cases, gaming machines are operable to dispense substantial monetary awards. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional or different components and features found in gaming machines are described below.

Though both personal computers, or personal computing devices as the term is used herein, and gaming machines employ microprocessors that control a variety of devices, adapting technology used in personal computers to a gaming machine can be quite difficult because of reasons such as the regulatory requirements that are placed upon gaming machines, the harsh environment in which gaming machines operate, security requirements and fault tolerance requirements. Further, techniques and methods for solving a problem in the computer industry, such as device compatibility and connectivity issues, might not be adequate in the gaming environment. For instance, a fault or a weakness tolerated in a personal computer, such as security holes in software or even frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between personal computer devices and gaming systems will be described. A first difference between gaming machines and common personal computer devices and systems based on personal computer devices is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and then before the award could be provided to the player the power failed, the gaming machine, upon the restoration of power, would return to the state where the award is indicated. The need to provide a state-based system affects the software and hardware design on a gaming machine.

A second important difference between gaming machines and common personal computer devices or personal computer-based systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common personal computer devices and personal computer-based systems is the number and kinds of peripheral devices used on a gaming machine are not as great as on personal computer based computer systems. Traditionally, in the gaming industry, gaming machines have been relatively simple in the sense that the number of peripheral devices and the number of functions the gaming machine has been limited. Further, in operation, the functionality of gaming machines are relatively constant once the gaming machine was deployed, and new peripherals devices and new gaming software are infrequently added to the gaming machine. This differs from a personal computer where users often buy different combinations of devices and software from different manufacturers and connect them to a computer to suit their needs. Therefore, the types of devices connected to a personal computer may vary greatly from user to user depending in their individual requirements and may vary significantly over time.

Although the variety of devices available for a personal computer may be greater than on a gaming machine, gaming machines still have unique device requirements that differ from a personal computer, such as device security requirements not usually addressed by personal computers. For instance, monetary devices, such as coin dispensers, bill validators and ticket printers and computing devices that are used to govern player accounts, credit and debit player account balances and handle the input and output of cash to a gaming machine have security requirements that are not typically addressed in personal computers. Therefore, many personal computer techniques and methods developed to facilitate device connectivity and device compatibility do not address the emphasis placed on security in the gaming industry.

The foregoing notwithstanding, features of the invention may be implemented on both gaming machines and personal computing devices or other devices which are not specially configured for the provision of a wagering game and therefore may lack components typically included in gaming machines. Accordingly, a gaming system as used herein refers to any and all of the foregoing machines and devices, including various configurations that may include one or more central servers, central controllers, or remote hosts, one or more electronic gaming machines and/or one or more devices which are not specially configured for the provision of a wagering game, such as desktop computers, laptop computers, tablet computers or computing devices, televisions, personal digital assistants (PDAs), mobile telephones such as smart phones, and other mobile computing devices, all of which are collectively referred to by the term personal computing devices used herein.

Thus, in various embodiments, the gaming system of the present disclosure may include: one or more electronic gaming machines in combination with one or more central servers, central controllers, or remote hosts; one or more personal computing devices in combination with one or more central servers, central controllers, or remote hosts; one or more personal computing devices in combination with one or more electronic gaming machines; one or more personal computing devices, one or more electronic gaming machines, and one or more central servers, central controllers, or remote hosts in combination with one another; a single electronic gaming machine; a plurality of electronic gaming machines in combination with one another; a single personal computing device; a plurality of personal computing devices in combination with one another; a single central server, central controller, or remote host; and/or a plurality of central servers, central controllers, or remote hosts in combination with one another. In the various embodiments, the personal computing devices and/or electronic gaming machines are configured to communicate with one another and/or the central server, central controller or remote host through a communication link, such as a local or wide area data network, closed, intranet or open system or remote link such as the Internet.

FIG. 1 illustrates a schematic of exemplary gaming system hardware and network platform that can be used to implement embodiments of the invention. The system includes gaming systems such as electronic gaming machines and plurality of personal computing devices, all of which are in communication with the same or different one or more central servers 2 through one or more communication links, which may include a data networks and the internet. Exemplary personal computing devices shown in FIG. 1 include workstations, terminals (including self-service wagering terminals), laptops or other internet connected computing systems, mobile or smart phones, tablet computers and televisions. For brevity and clarity, each gaming system, that is, electronic gaming machines and personal computing devices connected to a server 2 as shown in FIG. 1 or mentioned herein and any equivalents thereto will be collectively referred to by the term "EGM." Additionally, for brevity and clarity, unless specifically stated otherwise, an EGM as used herein represents one EGM or a plurality of EGMs, and a central server, central controller, or remote host as used herein represents one central server, central controller, or remote host or a plurality of central servers, central controllers, or remote hosts. Thus, the EGMs shown in FIG. 1 are generally designated by the reference numeral 1.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games, any secondary or bonus games and/or any non-primary and non-secondary games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: an EGM configured to communicate with a central server, central controller, or remote host through a data network; and/or a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: an EGM configured to communicate with a central server, central controller, or remote host through a data network; and/or a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: in an area of a gaming establishment different from an area of the gaming establishment in which the central server, central controller, or remote host is located; or in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: an EGM configured to communicate with a central server, central controller, or remote host through a data network; and/or a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the communication link, data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs).

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM. In other embodiments, at least one of the at least one processor of the EGM and the at least one memory device of the EGM reside outside the cabinet of the EGM In certain embodiments, as generally described herein, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games, secondary or bonus games and any non-primary and non-secondary games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

In various embodiments, the EGM includes one or more input devices. The input devices may include any suitable device that enables an input signal to be produced and received by the at least one processor of the EGM. One input device of the EGM may be a payment device configured to communicate with the at least one processor of the EGM to fund the EGM or a player account which is capable of funding the EGM. In certain embodiments, the payment device includes one or more of: a bill acceptor into which paper money is inserted to fund the EGM; a ticket acceptor into which a ticket or a voucher is inserted to fund the EGM; a coin slot into which coins or tokens are inserted to fund the EGM; a reader or a validator for credit cards, debit cards, or credit slips into which a credit card, debit card, or credit slip is inserted to fund the EGM; a player identification card reader into which a player identification card is inserted to fund the EGM; through communication with a bank account or mobile device, such as a smartphone, or other account configured for transferring funds or cryptocurrency to the EGM upon authorization by a player; or any suitable combination thereof.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display.

Figure 2:
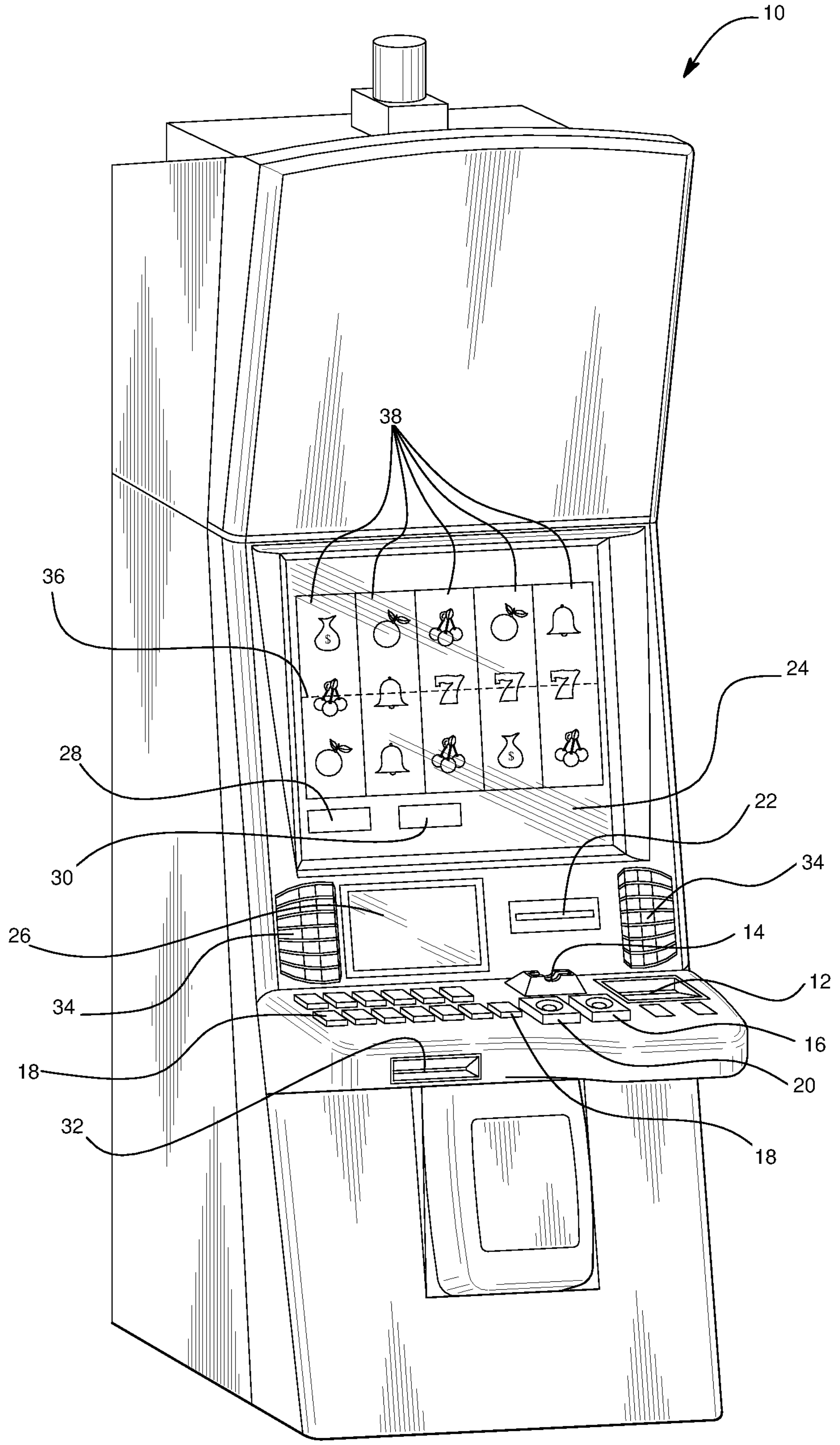
FIG. 2 is a perspective view of an exemplary embodiment of an electronic gaming machine which may be used with some embodiments of the invention.

FIG. 2 illustrates an exemplary EGM of the general type and form which may be fabricated and commercialized by any of the various gaming manufacturers generally indicated by the reference numeral 10 EGM 10 may be adapted to provide systems and methods as described herein, including a primary game with a secondary coin pusher game in operation according to any of the embodiments herein. For example, EGM 10 may be modified and include programming as needed for the EGM to provide on central display device 24 any of the games described above and The Big Shake or any other game or game feature shown in the accompanying documents.

EGM 10 includes payment devices including a combined bill and ticket acceptor 12, and a player loyalty card receiving slot 14. In various embodiments, one or more input devices of the EGM are one or more game play activation devices that are each used to initiate a play of a game on the EGM or a sequence of events associated with the EGM following appropriate funding of the EGM. EGM 10 includes a game play activation device in the form of a game play initiation button 16. It should be appreciated that, in other embodiments, the EGM begins game play automatically upon appropriate funding rather than upon utilization of the game play activation device.

In certain embodiments, one or more input devices of the EGM are one or more interactive input and wagering devices. Upon the utilization of the wagering device, a quantity of credits shown in a credit display decreases, and a number of credits shown in a bet display increases. EGM 10 includes one or more input devices 18 consisting of various depressible buttons or touch sensors. In other embodiments, one input device of the EGM is also a cash out device. The cash out device is utilized to receive a cash payment or any other suitable form of payment corresponding to a quantity of remaining credits of a credit display. EGM 10 includes a cash out device in the form of a cash out button 20.

In certain embodiments, one input device of the EGM is a touch-screen coupled to a touch-screen controller or other touch-sensitive display overlay to enable interaction with any images displayed on a display device. One such input device is a conventional touch-screen button panel. The touch-screen and the touch-screen controller are connected to a video controller. In these embodiments, signals are input to the EGM by touching the touch screen at the appropriate locations.

In embodiments including a player tracking system, one input device of the EGM is a card reader in communication with the at least one processor of the EGM. EGM 10 includes a card reader 22. The card reader is configured to read a player identification card inserted into the card reader.

In various embodiments, the EGM includes one or more output devices. One or more output devices of the EGM are one or more display devices configured to display any game(s) displayed by the EGM and any suitable information associated with such game(s). In certain embodiments, the display devices are connected to or mounted on a cabinet of the EGM. In various embodiments, the display devices serves as digital glass configured to advertise certain games or other aspects of the gaming establishment in which the EGM is located. In various embodiments, the EGM includes one or more of the following display devices: a central display device; a player tracking display configured to display various information regarding a player's player tracking status; a secondary or upper display device in addition to the central display device and the player tracking display; a credit display configured to display a current quantity of credits, amount of cash, account balance, or the equivalent; and a bet display configured to display an amount wagered for one or more plays of one or more games. EGM 10 includes a central display device 24, a player tracking display 26, a credit display 28, and a bet display 30.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: a ticket generator configured to generate and provide a ticket or credit slip representing a payout, wherein the ticket or credit slip may be redeemed via a cashier, a kiosk, or other suitable redemption system; a note generator configured to provide paper currency; a coin generator configured to provide coins or tokens in a coin payout tray; and any suitable combination thereof. EGM 10 for example includes ticket generator 32. In one embodiment, the EGM includes a payout device configured to fund an electronically recordable identification card or smart card or a bank account via an electronic funds transfer.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. EGM 10 includes a plurality of speakers 34.

As generally described above, in certain embodiments, such as EGM 10, EGMs have a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. EGMs may have varying cabinet and display configurations. It should be appreciated that, in certain embodiments, the EGM is a device that has obtained approval from a regulatory gaming commission, and in other embodiments, the EGM is a device that has not obtained approval from a regulatory gaming commission.

It should be appreciated given the definition assigned to EGMs hereunder that certain of the example EGMs described above include certain elements that may not be included in all EGMs. For example, the payment device of a personal gaming device such as a smartphone may not include a player card slot.

In various embodiments, the EGM includes one or more player tracking systems. Such player tracking systems enable operators of the gaming systems (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions on an EGM, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, an EGM may be implemented in one of a variety of different configurations. In various embodiments, the EGM may be implemented as one of: a dedicated EGM wherein computerized game programs executable by the EGM for controlling any primary or base games, any secondary or bonus games and any non-primary and non-secondary games or other functions displayed by the EGM are provided with the EGM prior to delivery to a gaming establishment or prior to being provided to a player; and a changeable EGM wherein computerized game programs executable by the EGM for controlling any primary games, secondary games and/or non-primary and non-secondary games displayed by the EGM are downloadable to the EGM through a data network or remote communication link after the EGM is physically located in a gaming establishment or after the EGM is provided to a player.

In some embodiments, the EGM of the invention may provide a primary and/or secondary and/or non-primary and non-secondary game which is a wholly or partially skill-based game and/or a partially or wholly randomly determined game, such as through a RNG. A winning game outcome and/or winning of an award may result in a quantity of credits being awarded to a player account established on the gaming system. In certain such embodiments, the random determination is provided through utilization of an RNG, such as a true RNG or a pseudo RNG, or any other suitable randomization process. In one such embodiment, each game outcome or award is associated with a probability, and the EGM generates the game outcome(s) and/or the award(s) to be provided based on the associated probabilities. In these embodiments, since the gaming system generates game outcomes and/or awards randomly or based on one or more probability calculations, there is no certainty that the EGM will ever provide any specific game outcome and/or award.

As discussed, the present disclosure contemplates a variety of different EGMs each having one or more of a plurality of different features, attributes, or characteristics. As noted above, in various embodiments, the EGM includes one or more executable game programs executable by at least one processor to provide any suitable games determined by a RNG as a primary game 40. For example, EGM 10 includes a payline 36 and a plurality of reels 38 as part of a conventional slot-type primary game involving one or more spinning reels with each reel displaying a plurality of indicia or symbols. Suitable games may also include skill-based games and other wagering games or combinations thereof, as a main or primary game and a coin pusher game as a secondary game. Exemplary embodiments herein below describe game features, particularly for games which may not previously be considered as a primary or a secondary game. However, each of the features of any of the games may be combined with another. Any of the features may involve or require player interaction or input, or occur automatically, either immediately along with an associated display or after a period of time has elapsed in which no player input is received, or combinations thereof. The operation of game features herein may be impacted by and a function of systems and methods configured to achieve a desired return to player ("RTP"). In some embodiments, the outcome of a game provided by the EGM may be non-redeemable, that is, the game is played for fun. In some embodiments, a benefit earned in one type of game, whether primary, secondary or through a feature which is not a primary or a secondary game, may be realized in a primary and/or secondary game.

Gaming systems of the invention may include a real-time or online accounting and gaming information system configured to communicate with the central server, central controller, or remote host. Accounting and gaming information modules in the gaming system include a player database for storing player profiles, a player tracking module for tracking players, and a credit system for providing automated transactions.

Further exemplary embodiments of gaming systems and processes and methods of operating the gaming system or EGM of the invention are described herein. Processes and methods may be represented, facilitated and carried forth by a set of instructions stored in one or more memories and executed by one or more processors which may be in communication with one or more random number generators.

Figure 3:
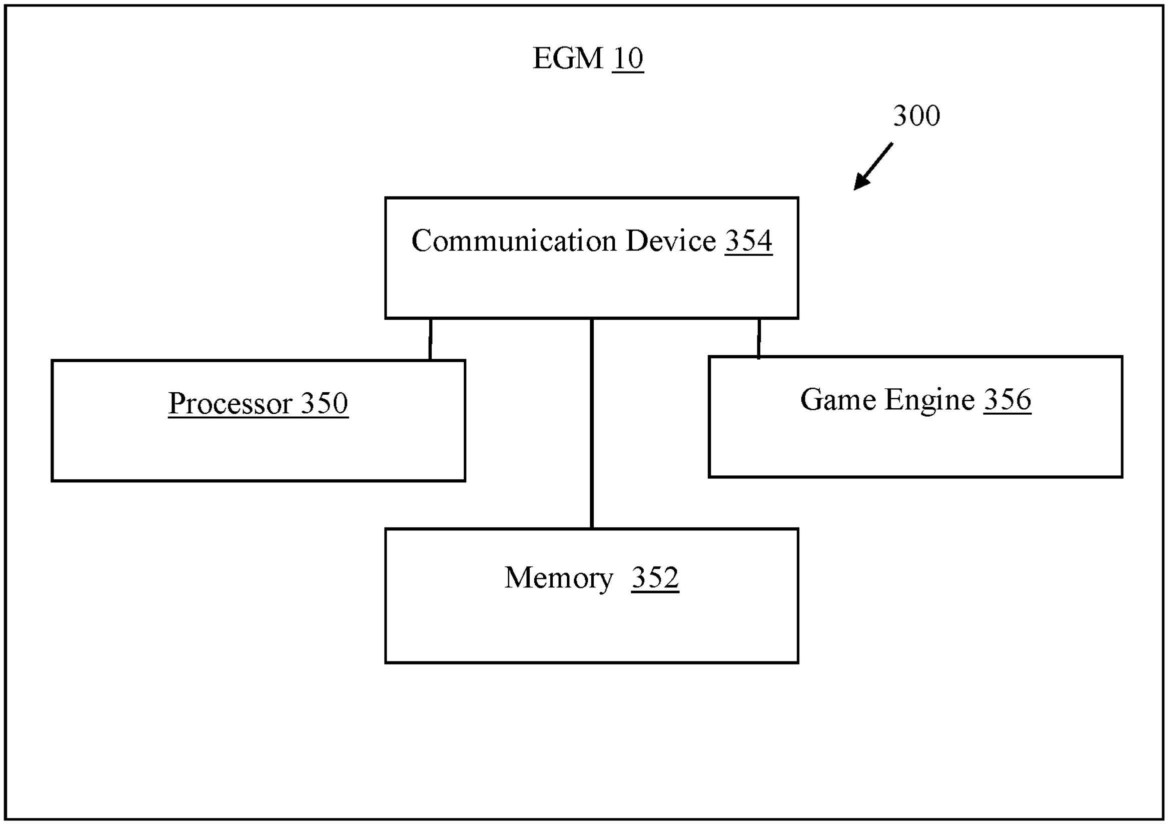
FIG. 3 is a schematic representation of components used in exemplary embodiments of an electronic gaming machine of the invention.
Figure 4:
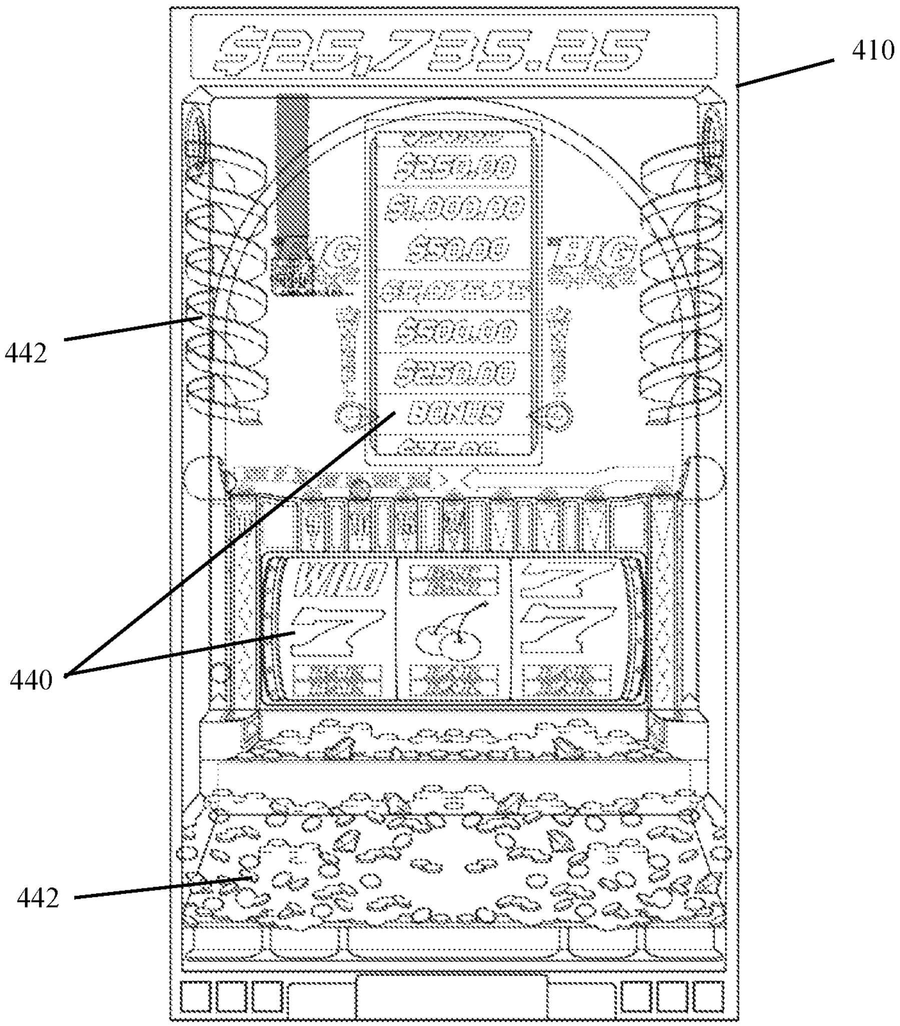
FIG. 4-11 depict various exemplary embodiments of a gaming system constructed and operated in accordance with the invention.
Figure 5:
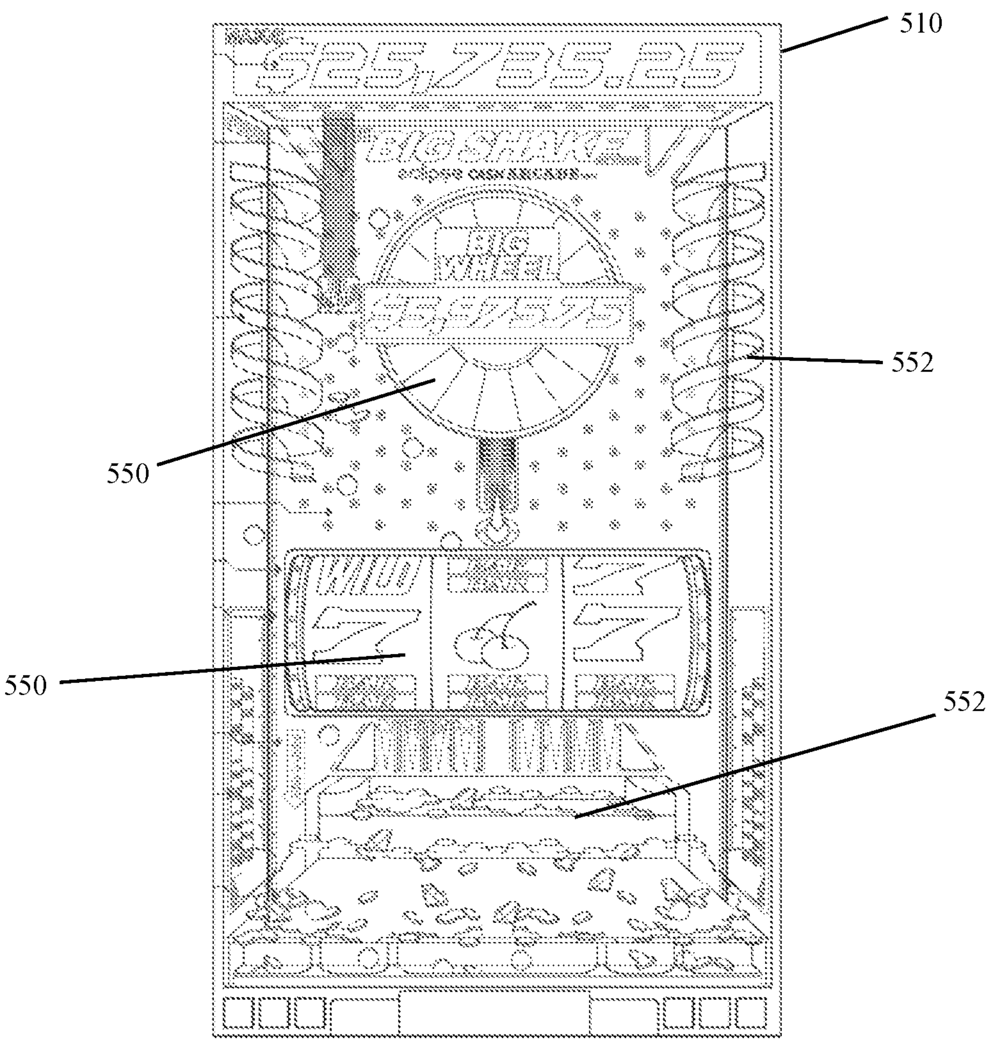
Figure 6:
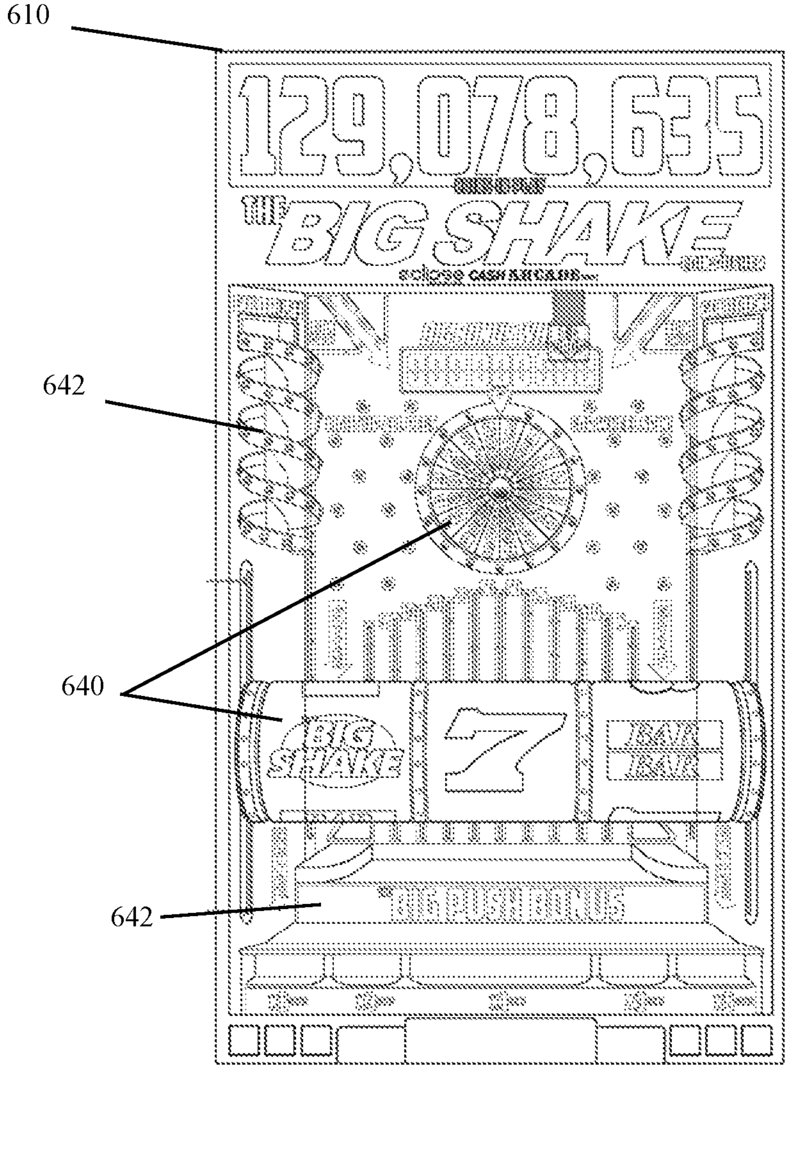
Figure 7:
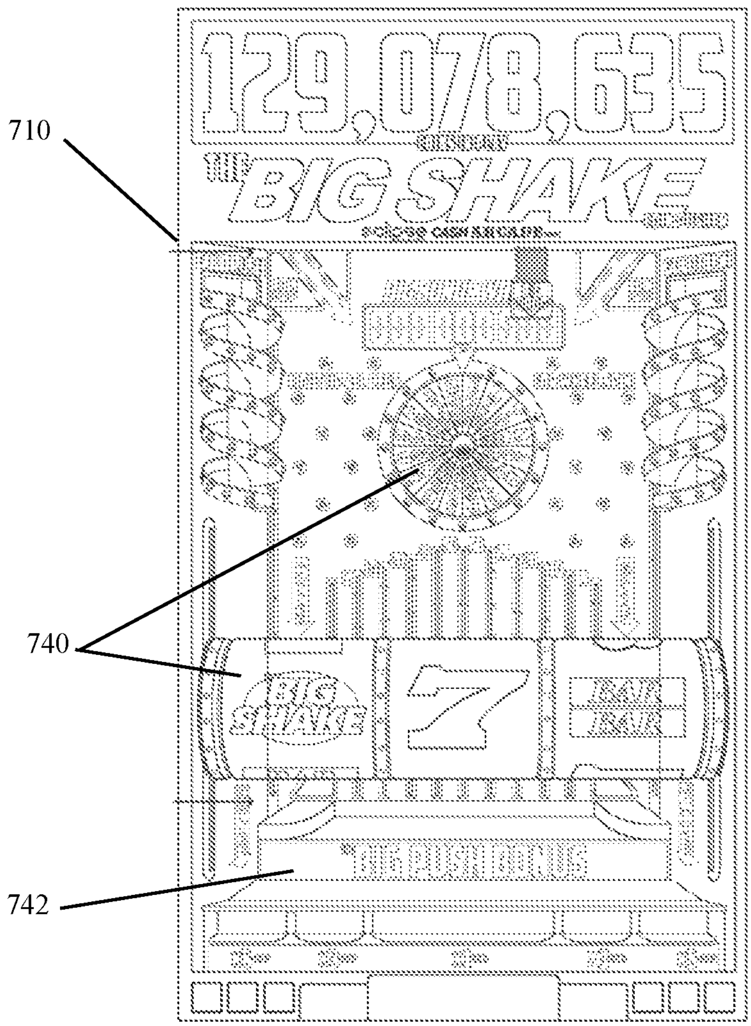
Figure 8:
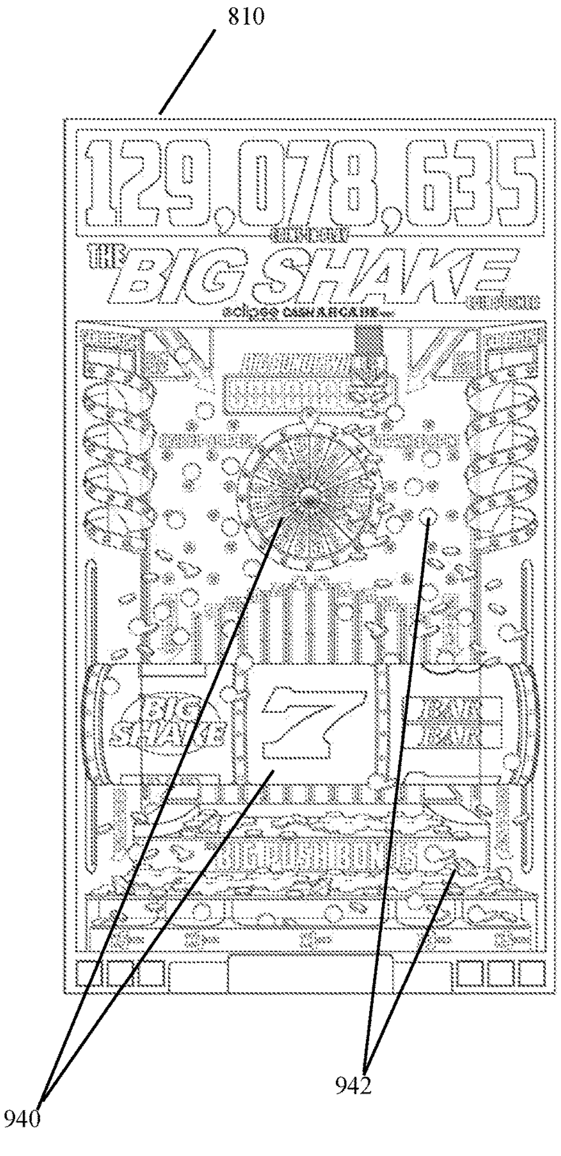
Figure 9:
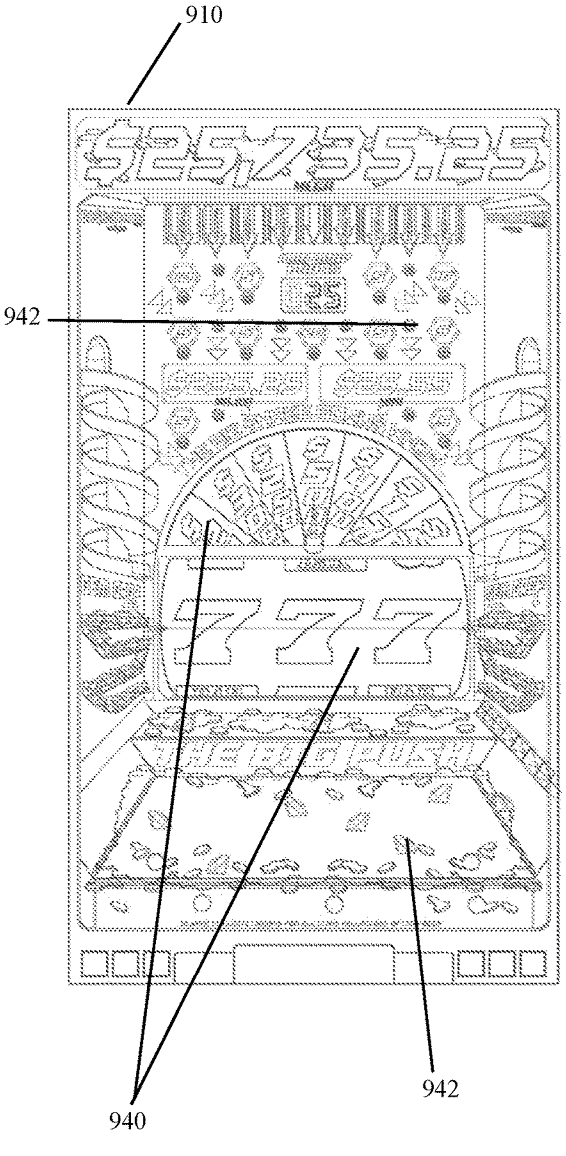
Figure 10:
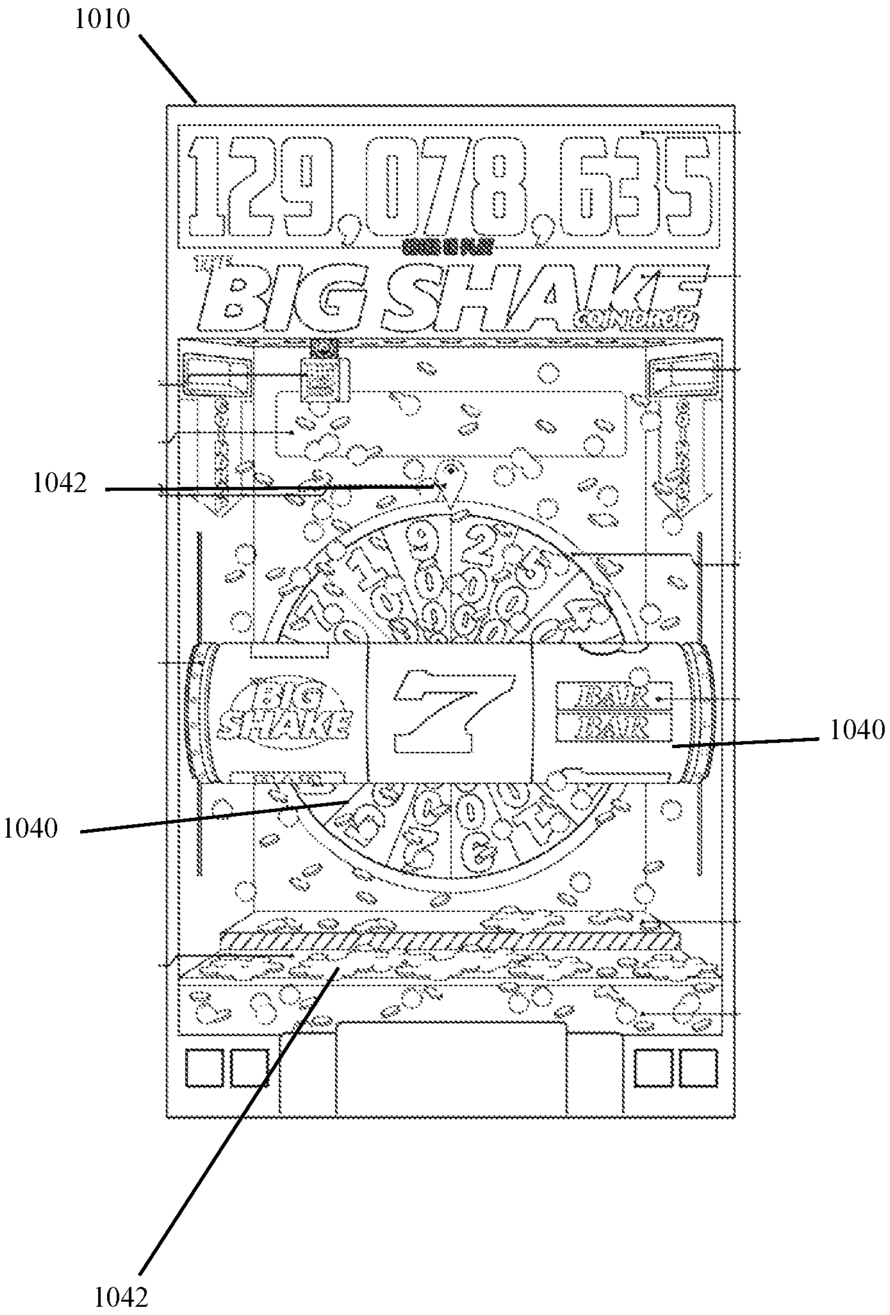
Figure 11:
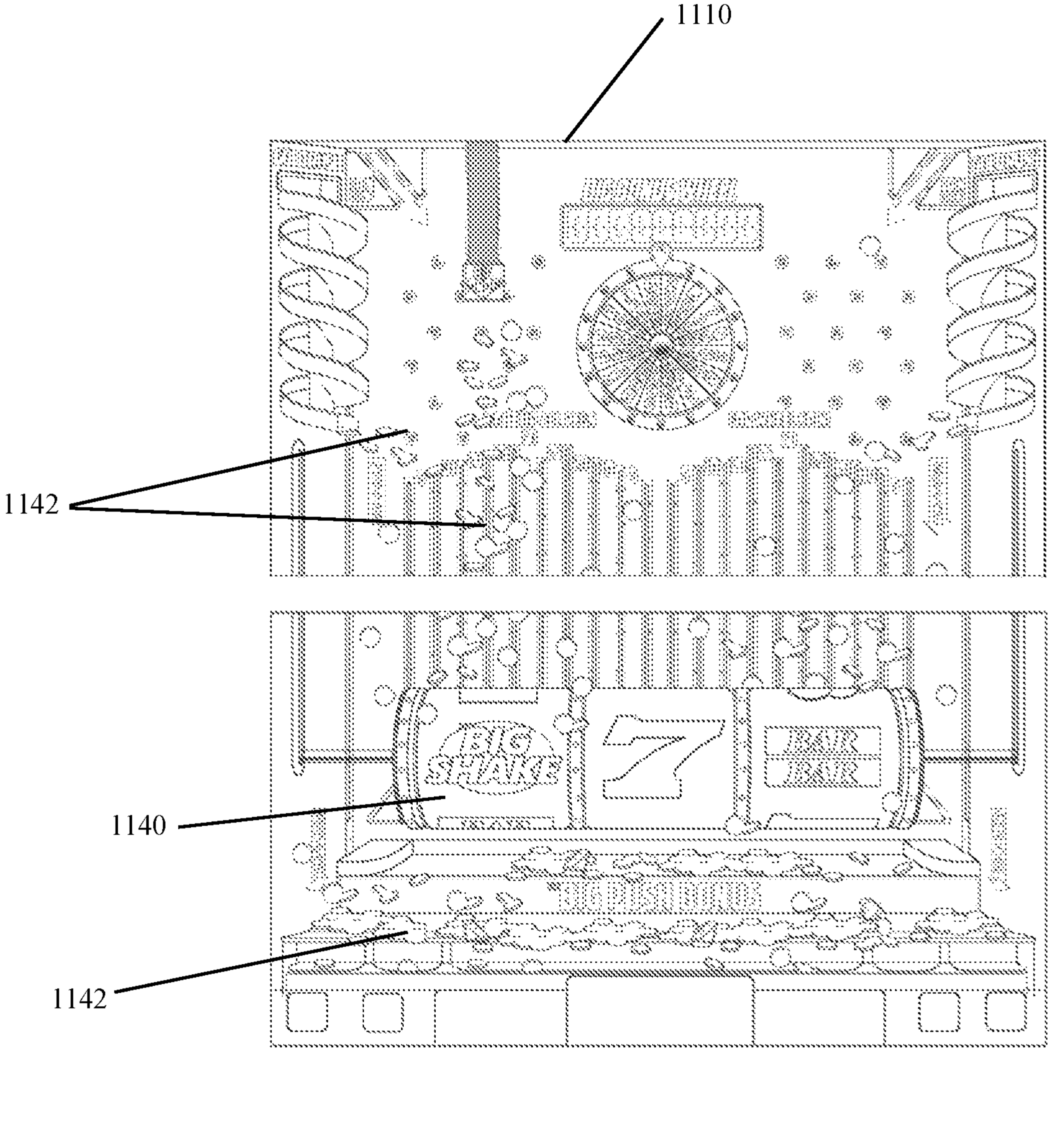

FIG. 3 illustrates a gaming system 300 of the invention which, in some embodiments, may be incorporated in, in communication with or included in EGM 10. System 300 is constructed to implement a gaming application in accordance with embodiments of the invention shown in the embodiments herein, among other things. Gaming system 300 includes one or more processing devices or processor 350 in communication with one or more memory devices 352, which includes processor-readable storage media that stores processor-executable instructions and data, and one or more communication devices 354 which enable the communication of signals and data as needed to receive and transmit game play data and other data. Data in memory 352 may include stored virtual object characteristic data and game play data received during game play generated by a game engine 356. Game engine 356 may generate game play data for determining events in the primary game 40 and a virtual object-based game 42 of the invention. The game play data may therefore include game outcome related data and virtual object data. Virtual object data may relate to the appearance, movement and/or positioning of virtual objects on the display device, such as display device 24 of EGM 10, including initial positioning data and thereafter, the movement and repositioning of virtual objects from the initial or prior position.

Processor 350 receives game play data generated by game engine 356 through communication devices 354 and loads instructions, algorithms and data from memory 352. At least one or more of the algorithms are configured to process virtual object data and generate virtual object response data responsive to receiving the game play data through communication device 354 subsequent to the generation and inclusion thereof in the game play data by game engine 358. The algorithm input includes the virtual object data generated by game engine 358 as part of the game play data (such as a game event in which one or more virtual objects are to be simulated as moving from one or more locations on the game display to a rest position on the game display) and virtual object characteristic data. The virtual object characteristic data relates to the recreation of physical attributes in the virtual depiction of the virtual object on the display device, and simulation of physics based on the assigned mass and displayed shape of the virtual object, the application of forces such as gravity, friction and the transfer of kinetic energy of interacting objects. In some embodiments, the game play data further includes instructions to use alternate virtual object characteristic data in the processing of the algorithm whereby the stored virtual object characteristic data is disregarded for one or more instances or a duration of game play. The game play data may also include instructions to continue certain actions between game play rounds or until the next or alternate game play data is generated.

For example, in the embodiments shown herein, the virtual objects are coins. Virtual object characteristic data relates to simulating gravity, kinetic energy and friction in coin behavior individually and as group or pile of coins. Game engine 358 may generate game play data including data relating to actions for display such as a coin dropping or a group of coins being pushed. The algorithm processes the game play data including the actions generated by game engine 358 and provides response data to be communicated through communication device 354 for actuation by processor 350 on the display 24, such as the dropping of one or more coins onto a pile of coins, the pushing of the pile towards an edge, in consideration of the initial or prior virtual object positioning data and the virtual object characteristic data to determine an intermediate virtual object positioning data (such as the location of the coins after the coins fall on top of the pile of coins) and a final virtual object positioning data (such as after one or more coins are moved or fall after being pushed by a coin pusher). The final virtual object positioning data becomes the prior virtual object positioning data upon the subsequent generation of game play data by game play engine 358. Animations and activities are determined by the algorithm and displayed on the display device, including any results from such activities. In some embodiments, one or more animations may be displayed from a limited group while the result, such as coins dropping and impacting a game result (as discussed herein and shown in the figures) is determined by the algorithm.

FIG. 4-11 illustrate exemplary embodiments of the present disclosure directed to gaming systems and methods for providing a game or game features through an EGMs 410 through 1110 in which images and animation are displayed on a display device to simultaneously depict a coin pusher type game (generally designated by the reference numeral 442, and like numbers) and a primary or main game (generally designated by the reference numeral 440, and like numbers), such as a slot reel and/or big wheel type game (a large vertical wheel with the wheel face being displayed facing the player), wherein the display includes interactions between the two games. Coin pusher game 442 is determined by a processing using an algorithm as discussed herein above which receives coin positioning data in the game play data generated by a game engine 356 when game engine 356 is determining game play outcomes in a main game 440 in combination with a random number generator, and thereafter determines coin response data for depicting the changes in the coins displayed on the EGM display device. As shown, main game 440 and coin pusher game 442 are configured such that game events in both games occur on the same display and appear interconnected, that is, events in game 440 actuate or impact events in game 442, and vice versa. It should be understood that a slot reel or big wheel type game is exemplary of a common type of game used for displaying randomly generated outcomes but the main game may be depicted as other types of games. For convenience sake features of the invention will be described herein in connection with a slot reel or big wheel type game.

In some embodiments, the coin pusher display game 442 includes the display of a plurality of coins or a coin pile depicted as being at rest in accordance with an initial or prior positioning data on a platform having an edge shown in the foreground. A pusher bar is depicted to alternatively move between a rearward position in the background to a position forward position towards the foreground responsive to game play data received by the game engine. The depiction of the pusher bar corresponds with the simulation and display of coins in the coin pile being pushed towards the platform edge pursuant to the coin response data determined by the processing of the algorithm of the invention. In some instances, the display further includes a depiction of one or more coins being pushed as a result of the movement of the pusher bar until a simulation of gravity corresponds with the one or more coins to falling off the edge of the platform in a foreground of the coin pusher game display.

Some interactions between the coin pusher display and the main game may include coins being dropped onto the platform before, at the same time as or responsive to main game activity, with the coins then being pushed by the pusher bar against the coin pile with one or more coins in the foreground being moved closer to, extending over the platform edge and/or falling over the platform edge. In some embodiments, the physics of coin movement is simulated randomly by the EGM processor.

In some embodiments, one or more coins are dropped or the coin pusher bar pushes one, some or no coins over the platform edge after each instance of the main game such that the EGM game outcome appears as being determined by the depiction of both the main game and the coin pusher game. In some embodiments, the interaction between the coin pusher display and main game includes coins appearing to be dropped in front of, behind or above elements of the main game such as the slot reel or big wheel, and thus, at times, coins are depicted as coming into contact with the elements of the main game. In other embodiments, coins may be depicted as rolling down a path or bumping into objects on the display. Coins may also be depicted as bouncing off the spinning reels or wheel, and the spinning reels or wheel may also move to then create an appearance of a greater amount of action and activity during each game.

In some embodiments, the outcome of the coin pusher game, which may include the depiction of coin movement on the platform is determined randomly independently of the main game, such as being actuated responsive to a randomly generated outcome in the main game. For example, the coin pusher game may be used to determine a bonus or additional result. In other embodiments, a random outcome may be generated and the result depicted by a combination of the main game and coin pusher game outcomes, despite the activity in both games appearing as being independent of one another. For example, the EGM may be bingo-based with a single outcome being determined and the displayed as a main game outcome resulting in credits to the player account on the EGM as well as coins being shown dropping on the platform and then subsequently pushed over the edge, resulting in additional credits to the player account. In other words, the results of the main game and coin pusher game illustrate the bingo-based result provided to the player that placed a wager on the EGM.

The game of the invention may further provide for interactions of the coin pusher game and player. For example, players may have an option to decide the timing or direction of a coin drop, such as by physically contacting a touchscreen display or button. Other interactions may include coins being dropped each round of a game with either the amount of coins being dropped (or the probability of a greater amount of coins being dropped) increasing based on the greater amount of unit wagered. A player selecting to bet the maximum bet will therefore at least seemingly be more likely to cause a coin drop that results in coins being pushed over the platform edge.

In any instance of a game outcome, the depiction of coins falling over the platform edge may correspond with or otherwise be used to indicate a benefit awarded to the player, such as free games, a bonus or higher payout to be credited to a player account established at the EGM. In some embodiments, the positions of coins and the coin pile return to a starting position upon a new player or game session being initiated. In other embodiments, the positions of coins and the coin pile remain the same from one game session to the next, whereby it would appear to players that they are more likely to benefit from the game results of previous players of the game. In some embodiments, the platform or other depicted elements may appear to move or be shaken to cause additional coins to fall and be counted as credits to the player.

Some embodiments of the invention are directed to a gaming system, comprising: a housing; at least one display device supported by the housing; one or more input devices; at least one processor; and at least one memory device that stores a plurality of instructions that, when executed by the at least one processor, cause the at least one processor to communicate with the at least one display device and the one or more input devices to: a) establish a credit balance through the one or more input devices; b) receive a wager through the one or more input devices to initiate play of a wagering game, the credit balance being decreasable by the wager; c) randomly display an outcome of an instance of play of the wagering game, wherein the displayed game outcome includes one or both of i) a depiction of a main game, wherein the main game includes the appearance of symbols from a plurality of symbols stored in the memory device and a main game outcome, and ii) a depiction of a coin pusher game, wherein the depiction includes one or more coins being moved by a pusher bar and a coin pusher game outcome; and e) determining an award outcome corresponding to the main game outcome and coin pusher game outcome, and increasing the credit balance by the determined award amount.

In this embodiment the EGM or gaming system of the invention may also be configured to operate a game play or a game play feature in which a portion of a single image are divided amongst one or more adjacent reels, such that when reels randomly stop with the portions of the single image adjacent one another, the portions correspond in a plurality of characteristics to form the single image. In some embodiments, the images may be divided into parts by the gaming system and stored into memory, thus enabling existing games having a plurality of symbols stored in memory, to be modified and played according to the embodiments described herein, as well as new games in which images are first divided into various image portions prior to game play. In such embodiments, images may be divided into parts upon initiating a game or instance of the game, thus providing a different gaming experience.

It should be understood that game play features of this embodiment, and player interaction or input involved in the game play feature of the coin pusher game, may be initiated and/or actuated through a variety of means, such as by an input device including an interface or specifically labeled hardware button, a software button, more general interaction with a touch screen, or via contact with buttons that are labeled differently, not labelled at all, or part of a larger interface peripheral. The coin pusher game feature may comprise or be included in every instance of the main game, or the coin pusher game feature or portions of the game feature may be implemented on some instances of the main game, such as during certain randomly generated outcomes or responsive to a player wagering the maximum units possible.

It should be understood that the methods, techniques, and actions performed by a gaming system as described in the above exemplary embodiments can be performed programmatically, or as a computer-implemented method. Programmatically, as used herein, means through the use of code or computer-executable instructions. These instructions can be stored in one or more memory resources of the computing device. A programmatically performed step may or may not be automatic. The exemplary embodiments can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Computer Program

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™ and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of player and game information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based.

In still further embodiments, a database is cloud computing-based. In other embodiments, a database is based on one or more local computer storage devices.

General Information Relating to Various Embodiments of the Invention

A controller, computing device, or computer, such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system, gaming device, gaming machine or incorporated in an existing gaming system or machine. The gaming machine of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

Those skilled in the art will readily appreciate that the apparatus described herein may include various computer and network related software and hardware, such as programs, operating systems, memory storage devices, data input/output devices, data processors, servers with links to data communication systems, wireless or otherwise, and data transceiving terminals. Those skilled in the art will further appreciate that the precise types of software and hardware used are not vital to the full implementation of the apparatus of the invention so long as it performs as described in at least one of the embodiments herein.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein and in the claims, and any equivalents thereto.

The invention claimed is:

1. A gaming system, comprising:

a housing; at least one display device supported by the housing;

a plurality of input devices supported by the housing; at least one processor; and at least one memory device that stores a plurality of instructions that, when executed by the at least one processor, cause the at least one processor to operate with the at least one display device and the plurality of input devices to:

(a) establish a credit balance based at least in part on a monetary value;

(b) place a wager to initiate play of a wagering game in response to receipt of an actuation of a wager button, the credit balance being decreasable by the wager;

(c) randomly determine and display a game outcome of an instance of play of the wagering game, wherein the game outcome includes one or more of the display of (i) a randomly generated one or more symbols of a plurality of symbols, (ii) a feature randomly generated including a coin pusher game display of a computer-generated animation sequence, during a play of the wagering game, involving a plurality of coins moving from one or more locations to a resting position wherein a plurality of the plurality of coins are individually assigned virtual physical attributes including a mass and a shape, movement of the plurality of the plurality of coins depicted in the animation sequence simulates application of gravity, friction, and transfer of kinetic energy of interacting coins based at least in part on the virtual physical attributes of the plurality of the plurality of coins, the computer-generated animation sequence including:

(1) a display of an animation of a coin pile depicted as being at rest on a platform with the platform having a platform edge in the foreground;

(2) a display of an animation of a pusher bar depicted to move between a rearward position in the background to a position forward position towards the foreground, wherein the depiction of the pusher bar corresponds with the display of the coin pile being pushed towards the platform edge; and (3) a display of an animation of a depiction of one or more coins falling off the platform edge in the foreground of the coin pusher game display as a result of the animation of the pusher bar, wherein the one or more coins falling off the platform edge corresponds with an award outcome based on the randomly determined game outcome; and (d) increase the credit balance based on the award outcome.

* * * * *